US010066644B2

(12) United States Patent
Opdenbosch

(10) Patent No.: US 10,066,644 B2
(45) Date of Patent: Sep. 4, 2018

(54) FORESTRY GRAPPLE WITH HIGH PRESSURE PROTECTION SYSTEM

(71) Applicant: Caterpillar Forest Products Inc., Peoria, IL (US)

(72) Inventor: Patrick Opdenbosch, Newnan, GA (US)

(73) Assignee: Caterpillar Forest Products Inc., Peoria, IL (US)

( * ) Notice: Subject to any disclaimer, the term of this patent is extended or adjusted under 35 U.S.C. 154(b) by 209 days.

(21) Appl. No.: 15/065,867

(22) Filed: Mar. 10, 2016

(65) Prior Publication Data

US 2016/0186787 A1    Jun. 30, 2016

(51) Int. Cl.
*F15B 11/04* (2006.01)
*F15B 11/044* (2006.01)
*A01G 23/00* (2006.01)

(52) U.S. Cl.
CPC ........ *F15B 11/0445* (2013.01); *A01G 23/003* (2013.01); *F15B 2211/3052* (2013.01); *F15B 2211/3111* (2013.01); *F15B 2211/3127* (2013.01); *F15B 2211/50518* (2013.01); *F15B 2211/50581* (2013.01); *F15B 2211/5159* (2013.01); *F15B 2211/7107* (2013.01)

(58) Field of Classification Search
CPC .......... F15B 11/0445; F15B 2211/6054; F15B 2211/71; F15B 2211/3052; F15B 2211/50581
See application file for complete search history.

(56) References Cited

U.S. PATENT DOCUMENTS

| | | |
|---|---|---|
| 3,854,766 A | 12/1974 | Jordan |
| 3,982,469 A * | 9/1976 | Bianchetta ............... F15B 11/02 60/484 |
| 4,379,674 A | 4/1983 | Meisel, Jr. et al. |
| 4,601,630 A | 7/1986 | Kress et al. |
| 4,787,293 A | 11/1988 | Kishizawa et al. |
| 5,558,380 A | 9/1996 | Meyer et al. |
| 5,907,991 A * | 6/1999 | Ramamoorthy ...... E02F 9/2203 91/436 |
| 2013/0129460 A1 | 5/2013 | Gabibulayev |

FOREIGN PATENT DOCUMENTS

| | | |
|---|---|---|
| EP | 0469416 | 2/1992 |
| JP | 2006077946 | 3/2006 |
| KR | 200902634 | 3/2009 |

\* cited by examiner

*Primary Examiner* — F. Daniel Lopez
*Assistant Examiner* — Abiy Teka

(57) ABSTRACT

A hydraulic control system for a work implement is provided. The hydraulic control system includes first hydraulic circuit and second hydraulic circuit. The first hydraulic circuit includes a selector valve and a pair of hydraulic cylinder assembly. Each hydraulic cylinder assembly includes a head end, a rod end, a cylinder, and a rod. The selector valve is configured to operate in neutral position and at least one operating position to selectively connect either the head end or the rod end to a fluid source, and the other of the head end or the rod end to fluid tank. The second hydraulic circuit includes a counterbalance valve and a shuttle valve. The counterbalance valve selectively connects the head end to the fluid tank. The shuttle valve is configured to maintain predefined pressure at relief side pressure port of the counterbalance valve to maintain a threshold pressure at the head end.

1 Claim, 5 Drawing Sheets

FORESTRY GRAPPLE WITH HIGH PRESSURE PROTECTION SYSTEM

TECHNICAL FIELD

The present disclosure relates to a forestry work machine. More particularly, the present disclosure relates to a high pressure protection system for hydraulic circuit of a work implement of the forestry work machine.

BACKGROUND

Various work machines such as tractors, skid steer loaders, forest machines, excavators and a wide variety of other work machines typically have a large number of hydraulically controlled work tools or attachments that are attachable or mountable to the particular work machine to perform a particular work function. A work tool can be a work enabling implement such a bucket, blade, ripper, drill, and a grapple. These work tools or attachments are typically controlled through a control system which typically includes one or more hydraulic systems which are used to actuate and control the work tool lift, extend/retract, and/or tilt mechanisms.

Work machines with work tools systems actuated with hydraulic systems include an actuating hydraulic cylinder assemblies to actuate and control the work tools. Further, the hydraulic systems include hydraulic control valves to allow control flow of hydraulic fluid and regulate hydraulic pressure within the hydraulic systems when work implements are subject to over-running loads. For example, in a forestry machine such as a log grapple, hydraulic check valves allow to hold load on the grapple tongs.

In the forestry machine, although the check valve may allow to hold load, however during certain work conditions, the grapple tong cylinder head-end may experience very high pressures (in the 10 kPSI range) which can cause damage to the hydraulic circuits. One such example can be during 'drop-and-catch' operations (wood logs are being repositioned inside the tongs by being dropped and caught again in mid-air) of the grapple tongs, the grapple tong actuation cylinder head-end experiences very high pressures.

U.S. Pat. No. 5,558,380 filed by Douglas and Stanley discloses a hydraulic system for a grapple. The hydraulic system includes a cross over relief valve assembly comprising two pressure relief valves connected in parallel with the flow divider valve. However, the '380 patent does not disclose any solution during momentarily high pressure experienced in the grapple tong actuation cylinder during the 'drop-and-catch' operations of the grapple.

The presently disclosed system is directed to overcoming one or more of the problems set forth above.

SUMMARY OF THE DISCLOSURE

A hydraulic control system for a work implement on a machine is provided. The hydraulic control system includes a first hydraulic circuit. The first hydraulic circuit includes a selector valve and a pair of hydraulic cylinder assembly. Each hydraulic cylinder assembly includes a head end, a rod end, a cylinder, a rod. The selector valve is configured to operate in a neutral position and at least one operating position to selectively connect either the head end or the rod end to a fluid source through a first fluid line, and the other of the head end or the rod end to a fluid tank through a second fluid line.

Further, the hydraulic control system includes a second hydraulic circuit. The second hydraulic circuit includes a counterbalance valve and a shuttle valve. The counterbalance valve selectively connects the head end to the fluid tank. The shuttle valve configured to maintain a predefined pressure at a relief side pressure port of the counterbalance valve to maintain a head end pressure of the pair of the hydraulic cylinders as a function of one or more parameters indicative of a threshold pressure applied to the work implement.

DETAILED DESCRIPTION

Figure 1:
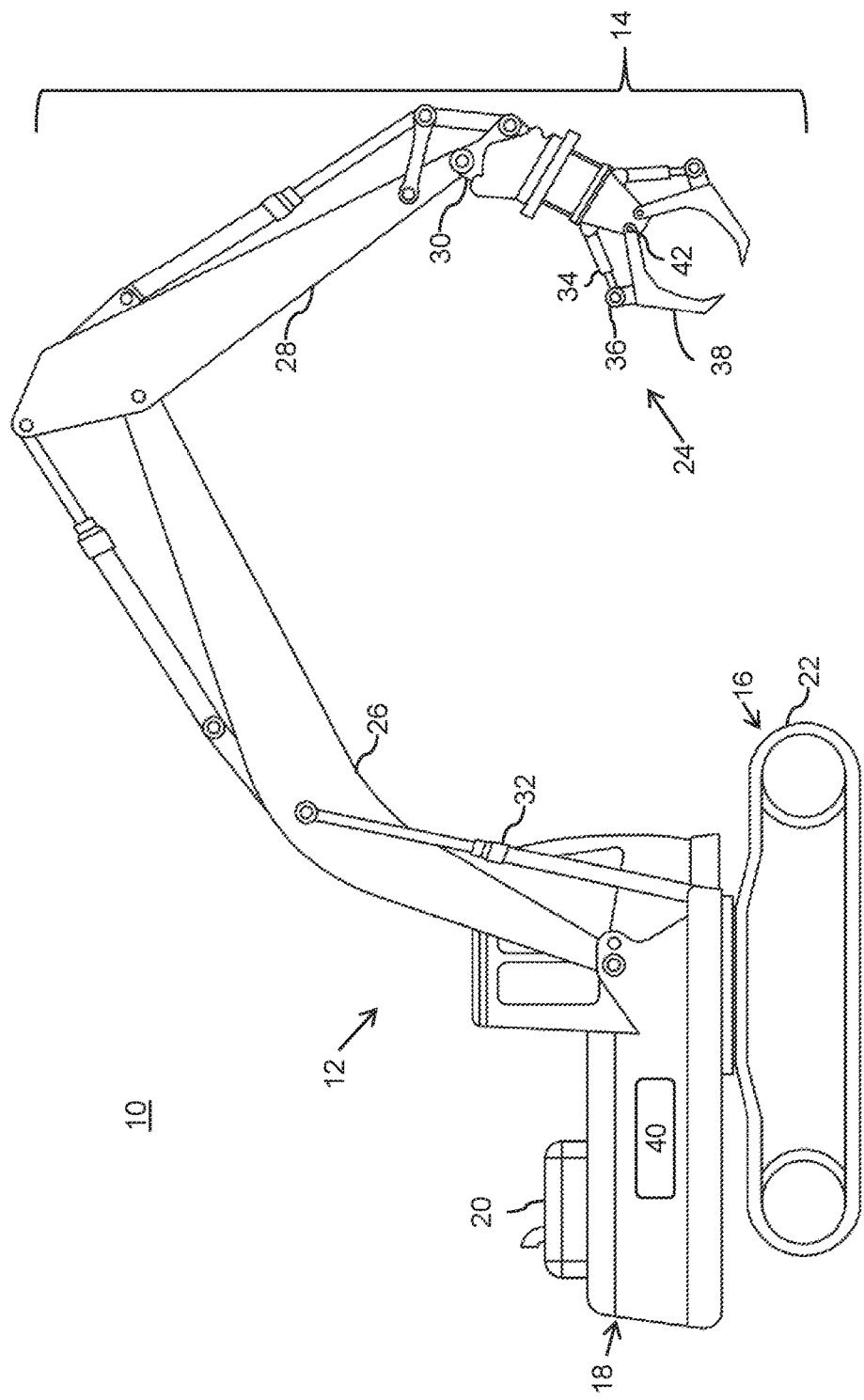
FIG. 1 illustrates an exemplary embodiment of a forestry machine, in accordance with the concepts of the present disclosure.

Referring to FIG. 1, an exemplary embodiment of a machine 10 is illustrated. In the embodiment illustrated, the machine 10 is depicted in particular is a forest grapple 12. The machine 10 may include both mobile and stationary machines such as, but not limited to, machines which have hydraulically powered work implements or any other stationary machines that would be known to one of ordinary skill in the art.

In one embodiment, the machine 10 may include but is not limited to vehicles that perform some type of operation associated with a particular industry such as mining, construction, farming, transportation, etc. and operate between or within work environments e.g. construction site, mine site, forests, power plants, on-highway applications, marine applications, etc. Non-limiting examples of the machine 10 include trucks, cranes, earthmoving vehicles, mining vehicles, excavators, backhoe loaders, tracked or wheel loaders, compactors, feller bunchers, forestry machines, forwarders, harvesters, motor graders, pipe layers, skid steer loaders, telehandlers, wheeled or tracked dozers, material handling equipment, farming equipment, locomotives and other vehicles which travel on tracks, and any type of construction machine that would be known by one of ordinary skill in the art.

The forest grapple 12 is equipped with systems that facilitate the operation of forest grapple 12 at a worksite, such as a logging site. In one embodiment, these systems include a work implement system 14, a drive system 16, and a power system 18 that provides power to the work implement system 14 and the drive system 16. In the depicted embodiment, the power system 18 includes an engine 20, for example an internal combustion engine. In alternative embodiments the power system 18 may include other power sources such as electric motors (not shown), fuel cells, (not shown), batteries (not shown), ultra-capacitors (not shown), electric generators (not shown), and/or any power source that would be known by one of ordinary skill in the art.

The drive system 16 may include a transmission (not shown), and propelling devices (not shown). The transmission may include any device or group of devices that may transfer force between the power system 18 and the ground propelling devices. The transmission may include one or more of a mechanical transmission, any variator, gearing, belts, pulleys, discs, chains, pumps, motors, clutches, brakes, torque converters, fluid couplings and any transmission that would be known by one of ordinary skill in the art.

In the depicted embodiment, the propelling device includes tracks 112. In alternative embodiments the propelling devices may include wheels, compacting drums, rollers, or any other propelling device which would be known by one of ordinary skill in the art.

The work implement system 14 includes a work implement 24, which may perform work at a worksite. The work implement 24 may include buckets, augers, blades, brooms, brush cutters, felling heads, forks, grapples, hammers, harvester heads, lift groups, material handling arms, mulchers, multi-processors, rakes, rippers, saws scarifiers, shears, stump grinders, snow plows and snow wings, tillers, trenchers, or any other work implement which would be known by one of ordinary skill in the art.

The work implement system 14 may include any members, and linkages; as well as any systems and controls to actuate the members and linkages as a function of operator, autonomous system, or other inputs, to maneuver the work implement 24 to perform work at a worksite.

Figure 2:
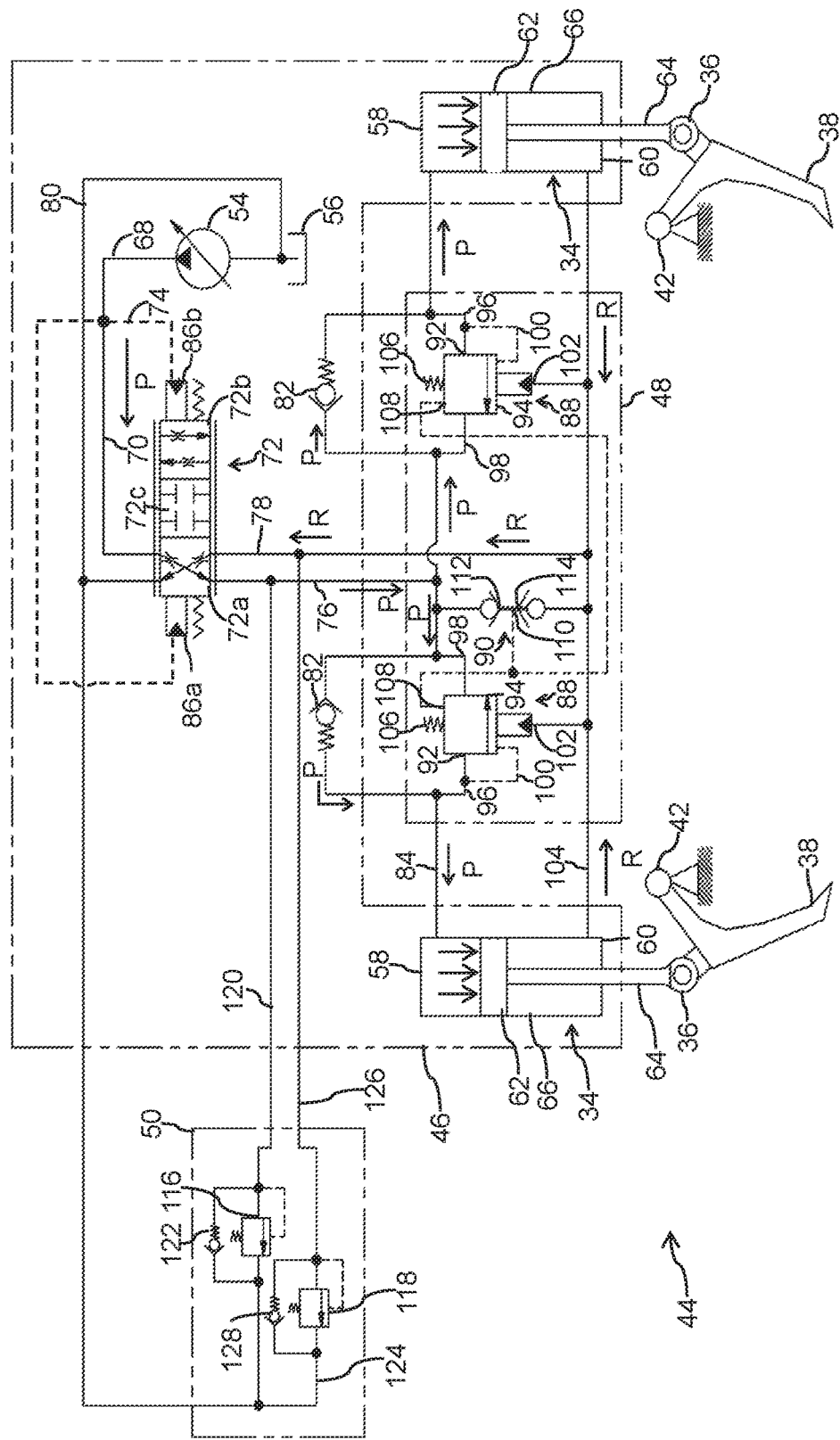
FIG. 2 illustrates an exemplary embodiment of a work implement hydraulic control system with a selector valve in a rod extension position, in accordance with the concepts of the present disclosure.

In one embodiment of the machine 10, the work implement system 14 also includes a boom 26, a stick 28, a connector coupling 30, at least one boom cylinder assembly 32, a pair of hydraulic cylinder assembly 34, a linkage 36, and pair of grapple tongs 38 pivoting at a pivoting point 42. Further, the work implement system 14 includes a hydraulic control system 44 (as shown in FIG. 2) and a controller 40 to control the work implement 24 thereby the grapple tongs 38. The hydraulic control system 44 is further described in relation to the embodiments disclosed in FIGS. 2, 3, 4, and 5.

Figure 3:
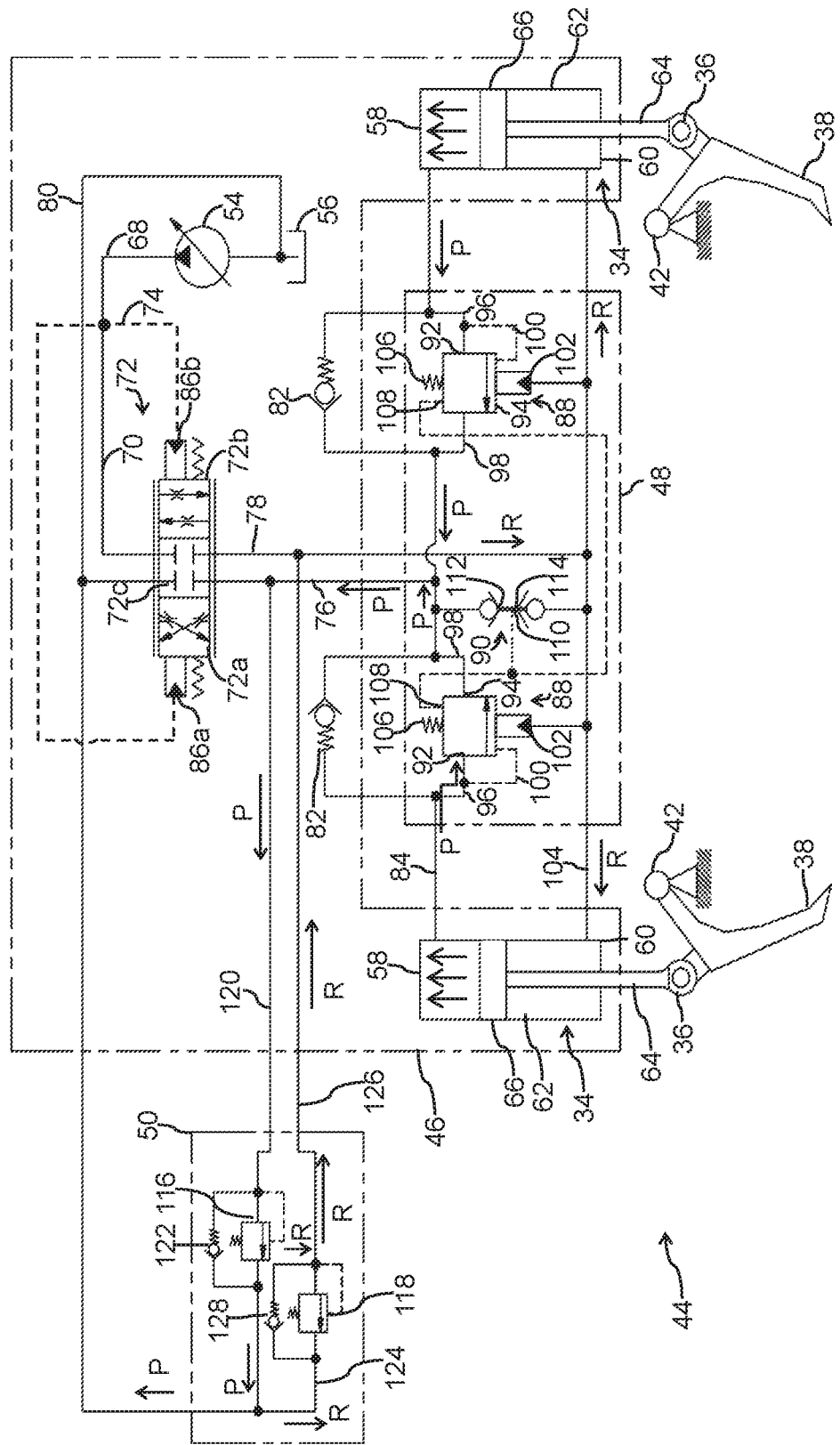
FIG. 3 illustrates the exemplary embodiment of the work implement hydraulic control system with the selector valve in a neutral position, in accordance with the concepts of the present disclosure.
Figure 4:
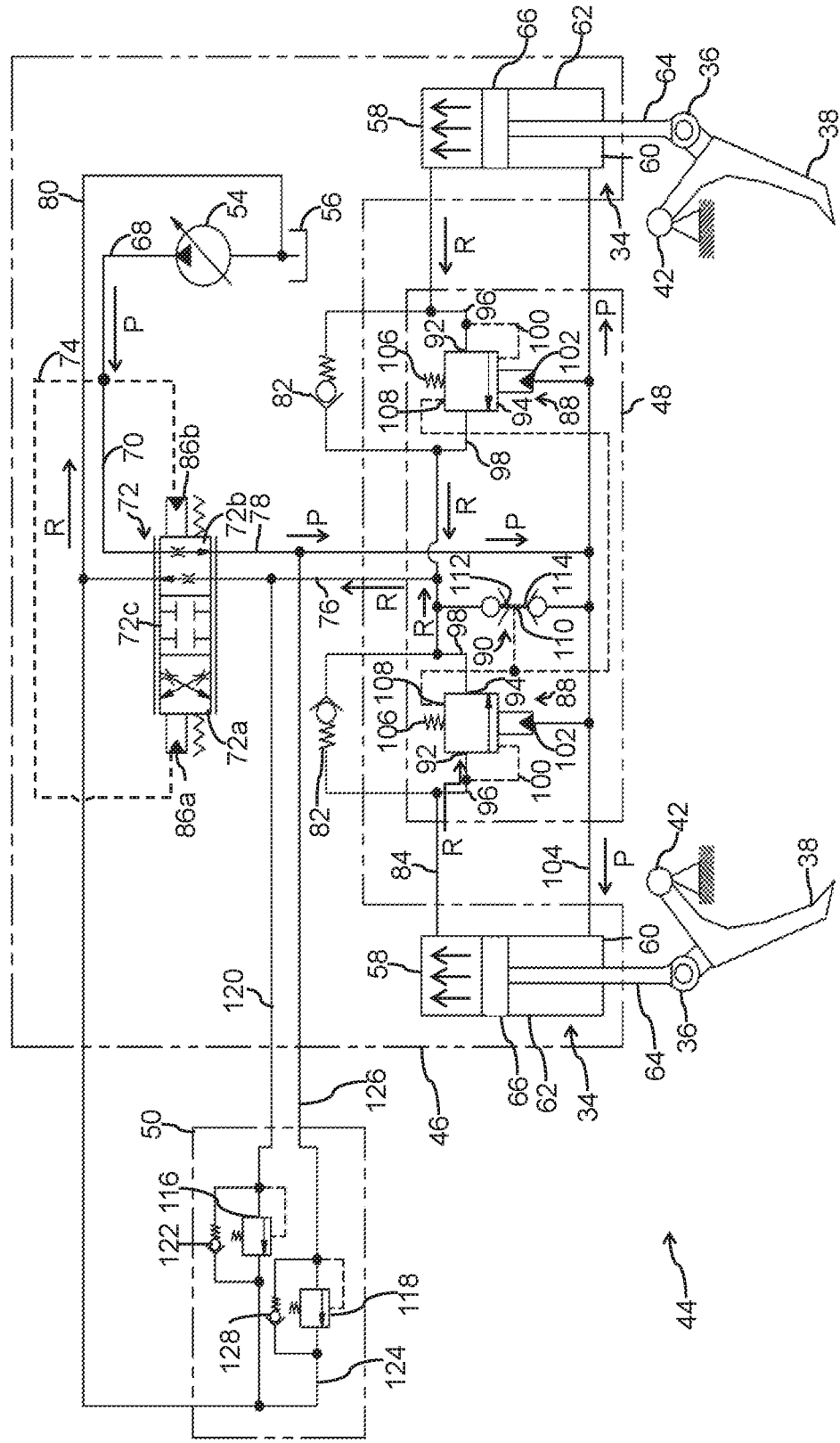
FIG. 4 illustrates the exemplary embodiment of the work implement hydraulic control system with the selector valve in a rod retraction position, in accordance with the concepts of the present disclosure.

Referring to FIGS. 2, 3, and 4, an exemplary embodiment of the hydraulic control system 44 of the work implement system 14 is described. The hydraulic control system 44 includes a first hydraulic circuit 46, a second hydraulic circuit 48, and a third hydraulic circuit 50.

The first hydraulic circuit 46 includes a pair of hydraulic cylinder assembly 34, a fluid source 54, and a fluid tank 56.

The pair of hydraulic cylinder assembly 34 includes a head end 58 having a head end pressure, a rod end 60 having a rod end pressure, a cylinder 62, a rod 64, and a piston 66 connected to the rod 64. The piston 66 is operable to slide within the cylinder 62 and divide the cylinder 62 in two chambers one each at the head end 58 and the rod end 60. The rod 64 is operably connected to the grapple tongs 38 of the work implement 24 through the linkage 36. The grapple tongs 38 open and close while pivoting about the pivoting point 42, when the rod 64 retract or expand, respectively, based on the head end pressure and the rod end pressure. The fluid tank 56 is selectively fluidly connected to the head end 58 and the rod end 60 through the fluid source 54. The fluid source 54 is selectively fluidly connected to the head end 58 and the rod end 60 through a fluid line 68 and a fluid line 70. Generally, the fluid tank 56 is fluidly connected to the rod end 60, when the fluid source 54 is fluidly connected to the head end 58. Conversely, when the fluid source 54 is fluidly connected to the rod end 60, generally, the fluid tank 56 is fluidly connected to the head end 58.

In the forest grapple 12 as depicted in FIG. 1, pressurized fluid may flow into the head end 58, extending the rod 64 from the cylinder 62, and closing the grapple tongs 38. As pressurized fluid flows into the head end 58, fluid flows out of the rod end 60. Pressurized fluid may also flow into the rod end 60, retracting the rod 64 into the cylinder 62, and opening the grapple tongs 38. As pressurized fluid flows into the rod end 60, fluid flows out of the head end 58.

The fluid source 54 may include any source of pressurized hydraulic fluid that would be known by one of ordinary skill in the art. The fluid source 54 may include a fixed displacement pump or a variable displacement pump. In the current embodiment, the pump is shown to be a variable displacement pump. In the depicted embodiment, engine 20 may drive the fluid source 54 through one or more gears. In alternative embodiments, the fluid source 54 may include a pump driven in any manner known by one of ordinary skill in the art. Non-limiting examples include gear driven, belt driven, or electric motor driven pumps.

The fluid tank 56 may include any reservoir for holding the fluid.

In the depicted embodiment, the first hydraulic circuit 46 includes a selector valve 72. The selector valve 72 may be configured to operate in a neutral position 72*c* and at least one operating position. In one embodiment, the selector valve 72 is shown to include three positions. Out of the three positions, a rod extension position 72*a* as shown in FIG. 2 and a rod retraction position 72*b* as shown in FIG. 4 are the operating positions. A neutral (closed) position is shown in FIG. 3.

In the depicted embodiment, the selector valve 72 is actuated proportionately by a pilot fluid line 74. The pilot fluid line 74 may be supplied by fluid source 54 or another fluid source not shown. Pilot fluid in the pilot fluid line 74 may flow to the selector valve 72 and be controlled by valves which are actuated by commands from the controller 40 or other mechanical or hydraulic means.

In the depicted embodiment, the selector valve 72 is connected to the head end 58 via a first fluid line 76. The rod end 60 is fluidly connected to the selector valve 72 through a second fluid line 78. The fluid source 54 is fluidly connected to the selector valve 72 through the fluid line 70. The fluid tank 56 is fluidly connected to the selector valve 72 through the third fluid line 80.

When the selector valve 72 is in the rod extension position 72*a* as shown in FIG. 2, pressurized fluid may flow from the fluid source 54 to the head end 58, through the fluid line 70, through the selector valve 72, through the first fluid line 76, through a check valve 82, and through a fourth fluid line 84. When the selector valve 72 is in the rod retraction position 72*b* as shown in FIG. 4, pressurized fluid may flow from the fluid source 54 to the rod end 60, through a fluid line 70, through the selector valve 72, through the second fluid line 78. When the selector valve 72 is in the neutral or closed (FIG. 3) position, pressurized fluid does not flow from the fluid source 54 to either the head end 58 or the rod end 60.

The selector valve 72 may include a rod extension pilot port 86*a*. When pilot fluid exerts a force greater than the opposing spring force at the rod extension pilot port 86*a*, the selector valve 72 may move right to the rod extension position 72*a*. The selector valve 72 may include a rod retraction pilot port 86*b*. When the pilot fluid exerts a force greater than the opposing spring force on the rod retraction pilot port 86b the selector valve 72 may move left to the rod retraction position 72b. In absence of pilot fluid, the selector valve 72 may be spring loaded to the neutral position 72c.

In an alternative embodiments, the selector valve 72 may be actuated proportionately to different positions through electrical current being applied to solenoids, or through pneumatic means. The selector valve 72 may be actuated to change positions in any way which would be known to one of ordinary skill in the art.

The second hydraulic circuit 48 includes a counterbalance valve 88 and a shuttle valve 90. The counterbalance valve 88 is a two position, spring biased, normally closed, and pilot fluid line actuated directional valve. In alternative embodiments the counterbalance valve 88 may include any device for controlling the flow of fluid in the second hydraulic circuit 48 from the head end 58 to the fluid tank 56. The counterbalance valve 88 has an inlet port 92 and an outlet port 94. The inlet port 92 of the counterbalance valve 88 is connected with the head end 58, through a fifth fluid line 96 and the fourth fluid line 84. The outlet port 94 is connected to the first fluid line 76 through a relief line 98.

The counterbalance valve 88 is actuated by a pilot fluid line 100. The pilot fluid line 100 is an internal feedback pilot line which is connected to the fifth fluid line 96. Further, the counterbalance valve 88 includes an actuation port 102. It may be noted that the actuation port 102 may be an optional port in the counterbalance valve 88. The actuation port 102 is connected with a sixth fluid line 104, exiting the rod end 60. Hydraulic pressure in the sixth fluid line 104 is biased against a spring 106 and a relief side pressure port 108. The spring 106 and pressure at the relief side pressure port 108 tend to keep the counterbalance valve 88 closed and prevent fluid to flow from the inlet port 92 to outlet port 94. The pressure in sixth fluid line 104 acts against the spring 106 and relief side pressure port 108 and tend to open the counterbalance valve 88 and allow flow of fluid from the inlet port 92 to the outlet port 94 and thereby to the relief line 98.

Typically, a counter balance valve may include a relief section (referred to as counterbalance valve 88) and a check valve section (referred to as check valve 82). In other words, the check valve 82 may include an in-built check valve 82. In the current embodiment, the counterbalance valve 88 and the check valve 82 are shown separate for ease of understanding. However, it may be noted that an integral valve unit with combination of the counterbalance valve 88 and the check valve 82 can also be employed.

Further, the second hydraulic circuit 48 includes the shuttle valve 90. The shuttle valve 90 may include any shuttle-type valve or ball-type valve that regulates the supply of fluid from more than one source into a single fluid line of the circuit, by allowing the lower pressure source to flow through the valve. The shuttle valve 90 includes an inlet port 110 connected to the relief side pressure port 108 of the counterbalance valve 88. The shuttle valve 90 further includes a first outlet port 112 and a second outlet port 114. The first outlet port 112 and the second outlet port 114 are connected to receive pressurized fluid from the first fluid line 76 and the second fluid line 78, respectively. The shuttle valve 90 is configured to selectively close either the first outlet port 112 or the second outlet port 114 to a pressure higher of the pressure in the first fluid line 76 and the pressure in the second fluid line 78. Upon actuation of the shuttle valve 90, in either position, when the first outlet port 112 or the second outlet port 114 is closed, the inlet port 110 opens the connection between the relief side pressure port 108 and the second fluid line 78. In other words, the relief side pressure port 108 of the counterbalance valve 88 is always subject to the lowest pressure in circuit 48. However, the lowest pressure subjected at the relief side pressure port 108 may be higher than the pressure in the fluid tank 56. In one embodiment, the lowest pressure at the relief side pressure port 108 can approximate zero pressure, when there is no back pressure or restriction in the third fluid line 80 and in selector valve 72, then the pressurized fluid may flow to the fluid tank 56. It may be noted that the fluid tank 56 is at zero pressure, and for pressurized fluid in the second fluid line 78 to flow towards the fluid tank 56 through the selector valve 72 and the third fluid line 80 may need a pressure differential to make the pressurized flow back to fluid tank 56. This would mean that pressure in second fluid line 78 would be higher than the pressure in the fluid tank 56. Thus, the relief side pressure port 108 of the counterbalance valve 88 is always subject to the lowest pressure in circuit 48. Hence, it can be said that the shuttle valve 90 closes the first outlet port 112 and opens the line connecting the inlet port 110 and the second outlet port 114, when the first outlet port 112 is subject to a higher pressure, such as during extension of the rod 64. In the alternate scenario, the shuttle valve 90 closes the second outlet port 114 and opens the line connecting the inlet port 110 and the first outlet port 112, when the second outlet port 114 is subject to higher pressure, during retraction of the rod 64.

FIG. 3, exemplifies the selector valve 72 in the neutral position 72c. An operator of the machine 10 can choose to hold a load, such as logs between the grapple tongs 38, and to do so may switch the selector valve 72 into neutral position 72c. During holding of the load on the grapple tongs 38, pressure at the head end 58 may increase due to weight of the logs. In such a scenario, pressure may increase in the head end chamber of the cylinder 62 and some fluid may flow from the head end 58, through the fourth fluid line 84, to the counterbalance valve 88. The check valve 82 prevents any flow of fluid.

When the pressure in the fourth fluid line 84 increases to or above a threshold pressure, an internal pilot signal through the pilot fluid line 100 actuates the counterbalance valve 88. The pressure in the sixth fluid line 104 tends to counters the spring 106 and the pressure at the relief side pressure port 108. Since, the pressure at relief side pressure port 108 is subject to approximate zero pressure because of shuttle valve 90, the pressure in the sixth fluid line 104 tends to counter only the spring 106. Hence, the spring 106 can be adjusted for a threshold pressure. In an embodiment, one or more parameters indicative of a threshold pressure being applied to the work implement 24 can be used to adjust the spring 106. For example, the size of the cylinder 62, type of grapple tongs 38 can may be used to adjust the spring 106 for a threshold pressure. Therefore, threshold pressure adjustment of the spring 106 can be balanced by the pressure in the sixth fluid line 104. Thus, opening the counterbalance valve 88 and allowing the fluid to flow through the inlet port 92 to the outlet port 94, thereby reducing the pressure at the head end 58.

In one embodiment, the pair of hydraulic cylinder assembly 34 may include an in cylinder pressure sensor (not shown) configured to generate a head end pressure signal indicative of the head end pressure. In the embodiment the pair of hydraulic cylinder assembly 34 may include a rod end pressure sensor (not shown) configured to generate a rod end pressure signal indicative of the rod end pressure. The head end pressure sensor (not shown) and the rod end pressure sensor (not shown) may be any sensor operable to generate a pressure sensor indicative of the threshold pressure being applied to the grapple tongs 38. In one embodiment, the hydraulic fluid pressure at the head end 58 and the rod end 60 can be communicated to the controller 40 to automatically adjust the spring 106.

The third hydraulic circuit 50 includes a first line relief valve 116 and a second line relief valve 118. The first line relief valve 116 is connected to the first fluid line 76 through a seventh fluid line 120. The first line relief valve 116 allows fluid in the seventh fluid line 120 to flow to the fluid tank 56 through the third fluid line 80, when the selector valve 72 is in the neutral position 72c (FIG. 3). Further, the first line relief valve 116 is disposed in parallel to a check valve 122. The check valve 122 prevents back flow of fluid passing through the first line relief valve 116.

The second line relief valve 118 is disposed downstream the first line relief valve 116 and is connected between the third fluid line 80 and the second fluid line 78, through an eighth fluid line 124, and an ninth fluid line 126. The second line relief valve 118 is also disposed in parallel with a check valve 128. When the pressure at the head end 58 increases the threshold pressure some fluid exists the head end 58 and flows to the fluid tank 56, through the counterbalance valve 88, through the first fluid line 76, through the first line relief valve 116. Some fluid exiting the head end 58 flows to the rod end 60 as a make-up fluid, through the eighth fluid line 124, through the check valve 128, through the ninth fluid line 126, through the second fluid line 78 and through the sixth fluid line 104. Hence, the third hydraulic circuit 50 enables the flow of make-up fluid back to the rod end 60 of the cylinder 62.

INDUSTRIAL APPLICABILITY

In operation, the position of the selector valve 72 is switched to the neutral position 72c (as shown in FIG. 3). In the neutral position 72c the selector valve 72 is closed, and pressurized fluid does not flow from the fluid source 54 to either the head end 58 or the rod end 60. In an embodiment, an operator of the forest grapple 12 may lift a logs load and thereafter choose to hold the logs load in position. In another embodiment, the operator may lift the logs load and then move forward holding the logs load with in the grapple tongs 38. In either embodiment the operator will switch the selector valve 72 to neutral position 72c. In an exemplary embodiment, the operator while holding the logs load may decide to move forward. During this motion the forest grapple 12 may pass over a bump and experience a momentarily bouncing of the logs load. The bouncing of the logs load on the grapple tongs 38 may cause a pressure spike at the head end 58 and vacuum at the rod end 60 of the cylinder 62. This pressure spike may be beyond the threshold pressure. To relieve the pressure spike, fluid at the head end 58 is flown to the fluid tank 56, through the counterbalance valve 88, through the first fluid line 76, through the first line relief valve 116 and through the third fluid line 80. In addition, a part of the fluid in the third fluid line 80 is flown to the rod end 60, through the eighth fluid line 124, through the check valve 128, through the ninth fluid line 126, through the second fluid line 78, and through the sixth fluid line 104 to make-up and compensate for the vacuum at the rod end 60. For reference, the arrows marked "P" illustrate the flow of pressurized fluid from the head end 58 to the fluid tank 56. The arrows marked "R" illustrate the flow of fluid from the third fluid line 80 to the rod end 60, through the eighth fluid line 124, through the check valve 128, through the ninth fluid line 126, through the second fluid line 78, and through the fluid line 68.

FIG. 4 exemplifies the selector valve 72 switched to the rod retraction position 72b. When the selector valve 72 is in the rod retraction position 72b, pressurized fluid may flow from the fluid source 54 to the rod end 60, through the a fluid line 70, through the selector valve 72, through the second fluid line 78, through the sixth fluid line 104 to the rod end 60. For reference, the arrows marked "P" illustrate the flow of pressurized fluid from the fluid source 54 to the rod end 60. The arrows marked "R" illustrate the flow of fluid from head end 58 to the fluid tank 56, through the first fluid line 76, through the selector valve 72, and through the third fluid line 80.

Figure 5:
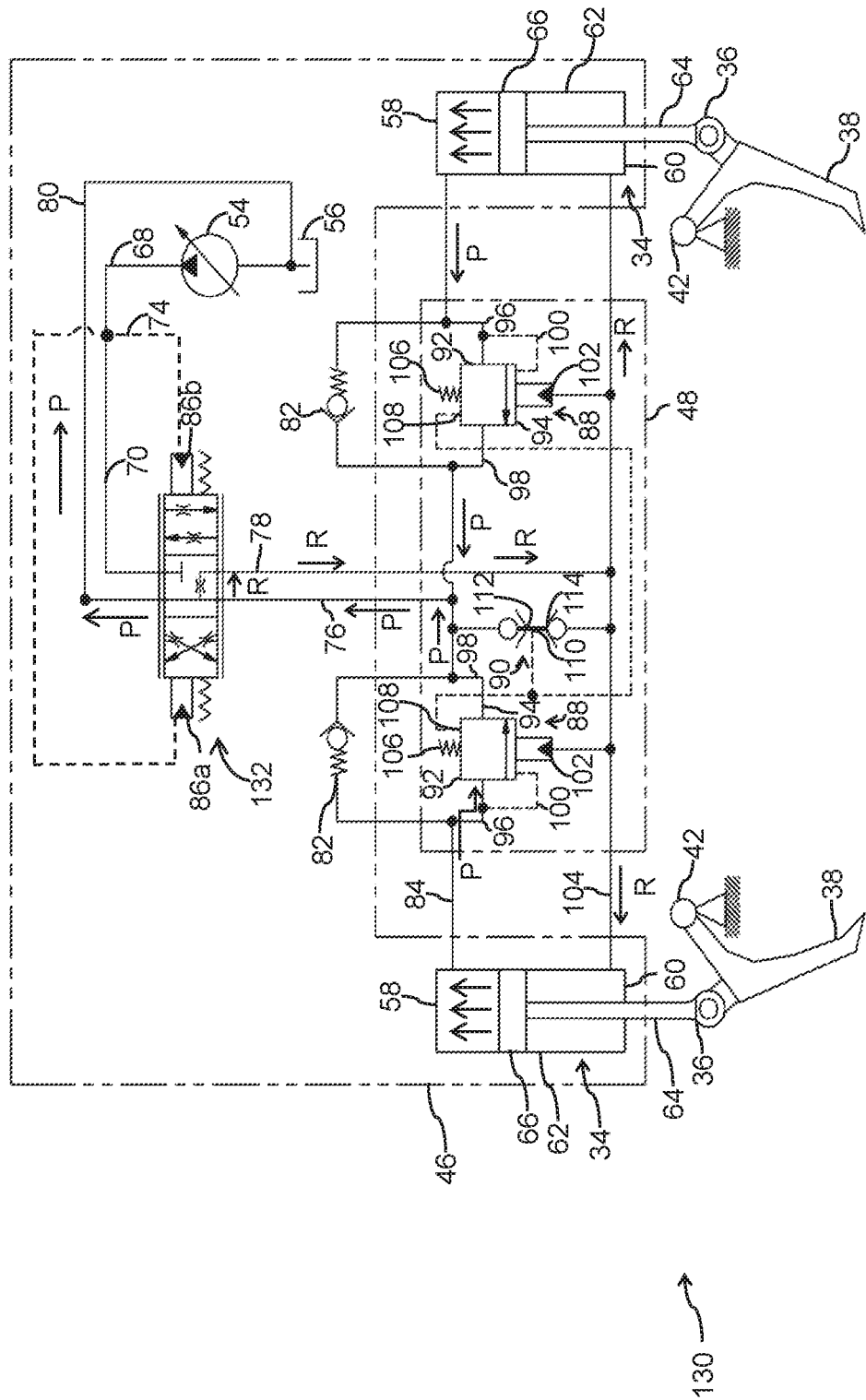
FIG. 5 illustrates the alternate embodiment of the work implement hydraulic control system with an alternate selector valve in a neutral position, in accordance with the concepts of the present disclosure.

FIG. 5 exemplifies an alternate embodiment 130 of the hydraulic control system 44 with an alternate selector valve 132. The alternate selector valve 132 is shown in a neutral position 72c. In the alternate embodiment, the alternate selector valve 132 may be configured to operate in three positions like the selector valve 72. However, the alternate selector valve 132 includes a modified neutral position, as compared to the neutral position 72c as illustrated in FIG. 3. The operating positions, that is, the rod extension position 72a and the rod retraction position 72b of the alternate selector valve 132 is similar to that described in FIG. 2 and FIG. 4 respectively.

In the neutral position 72c of the alternate selector valve 132 (as shown in FIG. 5), the first fluid line 76 and the second fluid line 78 are connected within alternate selector valve 132 through a tenth fluid line 134. Pressurized fluid may not flow from the fluid source 54 to either the head end 58 or the rod end 60 when the alternate selector valve 132 is in the neutral position 72c. However, fluid from the head end 58 may flow to the fluid tank 56, through the first fluid line 76, through the alternate selector valve 132, and through the third fluid line 80, when the pressure in the head end 58 increases beyond the threshold pressure and need for reducing pressure at the head end 58 arises. Further, a part of the fluid flowing through the alternate selector valve 132 to the fluid tank 56 is flown towards the second fluid line 78 through the tenth fluid line 134. The fluid flowing through the tenth fluid line 134 flows to the rod end 60 to compensate for the vacuum at the rod end 60.

For reference, the arrows marked "P" illustrate the flow of pressurized fluid from the head end 58 to the fluid tank 56. The arrows marked "R" illustrate the flow of fluid from head end 58 to rod end 60, through the tenth fluid line 134.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. A hydraulic control system for a work implement on a machine, comprising:
 a first hydraulic circuit including a selector valve and a pair of hydraulic cylinder assemblies, each hydraulic cylinder assembly including a head end, a rod end, a cylinder, and a rod; the selector valve configured to operate in a neutral position and at least one operating position to selectively connect either both head ends or both rod ends to a fluid source through a first fluid line, and the other of the head end or the rod end to a fluid tank through a second fluid line;

a second hydraulic circuit including a counterbalance valve and a shuttle valve, the counterbalance valve selectively connecting both head ends to the fluid tank, and the shuttle valve configured to maintain a predefined pressure at a relief side pressure port of the counterbalance valve to maintain a head end pressure of the pair of the hydraulic cylinders as a function of one or more parameters indicative of a threshold pressure applied to the work implement; and a third circuit including a pressure relief valve configured to selectively connect the first hydraulic circuit and the second hydraulic circuit to the fluid tank, as a function of pressure in the first hydraulic circuit and the second hydraulic circuit.

* * * * *